United States Patent [19]

Yamasaki et al.

[11] Patent Number: 5,190,008
[45] Date of Patent: Mar. 2, 1993

[54] LEAN BURN INTERNAL COMBUSTION ENGINE

[75] Inventors: Hirofumi Yamasaki, Kakogawa; Kiyoshi Yagi, Kobe; Keisuke Tsukamoto, Toyota; Toshio Takaoka, Toyota; Takao Fukuma, Toyota, all of Japan

[73] Assignees: Fujitsu Ten Limited, Kobe; Toyota Jidosha Kabushiki Kaisha, Toyota, both of Japan

[21] Appl. No.: 921,961

[22] Filed: Aug. 4, 1992

Related U.S. Application Data

[63] Continuation of Ser. No. 654,970, Dec. 14, 1991, abandoned.

[30] Foreign Application Priority Data

Feb. 15, 1990 [JP] Japan ............................ 2-34987
Feb. 15, 1990 [JP] Japan ............................ 2-34989

[51] Int. Cl.$^5$ .......................................... F02D 43/04
[52] U.S. Cl. ............................ 123/306; 123/412; 123/417; 123/486
[58] Field of Search ........... 123/306, 308, 412, 416, 123/417, 480, 486, 478

[56] References Cited

U.S. PATENT DOCUMENTS

| | | | |
|---|---|---|---|
| 4,261,315 | 4/1981 | Geiger et al. | 123/478 |
| 4,332,226 | 6/1982 | Nomura et al. | 123/478 |
| 4,332,315 | 4/1981 | Geiger et al. | 123/478 |
| 4,483,294 | 11/1984 | Sawamoto | 123/417 |
| 4,520,783 | 6/1985 | Matsushita et al. | 123/492 |
| 4,587,938 | 5/1986 | Kobayashi et al. | 123/417 |
| 4,590,563 | 5/1986 | Matsumura et al. | 123/416 |
| 4,651,700 | 3/1987 | Kobayashi et al. | |
| 4,719,888 | 1/1988 | Kobayashi et al. | |
| 4,725,955 | 2/1988 | Kobayashi et al. | 364/431.05 |

FOREIGN PATENT DOCUMENTS

| | | |
|---|---|---|
| 0400529 | 12/1990 | European Pat. Off. |
| 58-59327 | 4/1983 | Japan |
| 60-169649 | 9/1985 | Japan |
| 60-190620 | 9/1985 | Japan |
| 60-237141 | 11/1985 | Japan |
| 60-249637 | 12/1985 | Japan |
| 62-195461 | 8/1987 | Japan |
| 62-199943 | 9/1987 | Japan |
| 62-279270 | 12/1987 | Japan |

Primary Examiner—Andrew M. Dolinar
Attorney, Agent, or Firm—Cushman, Darby & Cushman

[57] ABSTRACT

A lean burn internal combustion engine has a basic fuel injection amount calculated and multiplied by a lean correction factor, the resulting amount controls the air fuel ratio of the engine. The lean correction multiplied by factor is calculated from a first map based on intake pressure and engine speed. However, when the degree of opening of the throttle valve is larger than a predetermined value, a second correction map based on the degree of opening of the throttle valve and engine speed is used to obtain the lean correction factor. When the second correction map is employed, an ignition timing map based on the degree of opening of the throttle valve and engine speed is used to obtain an ignition timing; instead of the usual ignition timing, based on intake pressure and engine speed.

6 Claims, 8 Drawing Sheets

LEAN BURN INTERNAL COMBUSTION ENGINE

This is a continuation of application No. 07/654,970, filed on Feb. 14, 1991, which was abandond upon the filing hereof.

BACKGROUND OF THE INVENTION

1. Field of the Invention

The present invention relates to a lean burn internal combustion engine, and in particular, relates to a control of an air-fuel ratio and ignition timing in the lean burn internal combustion engine.

2. Description of the Related Art

A known prior art lean burn combustion engine has an operating area, such as a low load condition, wherein a lean combustible mixture is introduced into the engine to increase the fuel consumption efficiency. In this lean burn engine, a basic fuel injection amount, which is an amount of fuel needed for providing a theoretical air-fuel ratio at a combination of an engine speed and engine load parameter such as intake pressure, is first calculated, and then, to obtain the lean air-fuel mixture, a lean correction factor having a value smaller than 1.0 is multiplied by the basic fuel injection amount. A lean correction factor map is provided, which is constructed by values of a lean correction factor with respect to combinations of an engine speed and an intake pressure. When the engine goes from the lean area to a power area, due to a depression of the acceleration pedal, a fuel enrichment correction is carried out to obtain a desired engine torque.

The prior art lean combustion engine suffers from a drawback in that a shock is generated when the engine leaves the lean zone and enters the power mode. In the lean zone, the lean air-fuel mixture is obtained by multiplying the lean correction factor having a value smaller than 1.0 by the basic fuel injection amount corresponding to the theoretical air-fuel ratio. The lean correction factor is calculated from the intake pressure and engine speed by using a map interpolation technique. The value of the intake pressure is initially increased in accordance with the increase in the degree of the depression of the accelerator pedal, to obtain a desired increase in the engine torque. Once the degree of the opening of the throttle valve reaches a predetermined value, however, the value of the intake pressure remains substantially unchanged, and therefore, a desired increase in torque cannot be obtained. When the accelerator pedal is further depressed, the engine enters the power area, from the low torque state, where a fuel enrichment correction is carried out to abruptly increase the engine torque, which causes a shock to be generated.

To overcome this drawback, a system has been proposed wherein a second lean correction factor map is provided, and a lean correction factor is calculated from a combination of the value of a degree of opening of the throttle valve and the engine speed. See U.S. Pat. application No. 528,565, filed on May 24, 1990. At the degree of opening of the throttle valve where the intake pressure remains unchanged, this second map for the lean correction factor based on the throttle opening is used, and as a result, the engine torque can be increased even if the intake pressure remains unchanged, and therefore, an occurrence of torque shock is prevented when the engine enters the power zone.

Nevertheless, the provision of the second lean correction factor suffers from a drawback in that the ignition timing is far from an optimum ignition timing if the ignition timing is calculated by the ignition timing map based on the intake pressure. When the throttle opening map is used for calculating the lean correction factor, the air-fuel ratio can be varied as the degree of the opening of the throttle valve is increased, even if the intake pressure remains unchanged, but the calculation of the ignition timing based on the intake pressure causes the ignition timing to remain substantially unchanged. As is well known, the change in the air-fuel ratio by the employment of the throttle opening map for calculating the lean correction factor causes the desired ignition timing to be changed, but the employment of the intake pressure map for calculating the ignition timing leaves it unchanged. As a result, the prior art provision of a second lean correction factor map based on the degree of throttle opening suffers from a drawback in that a desired ignition timing cannot be obtained.

SUMMARY OF THE INVENTION

An object of the present invention is to provide a lean burn engine of the above mentioned type, capable of obtaining a desired ignition timing.

According to the present invention, a lean burn internal combustion engine is provided, comprising:

an engine body;

an intake line for introducing intake air into the engine body;

a throttle valve in said intake line for controlling an amount of air introduced into the engine body;

fuel supply means for supplying an amount of fuel into the intake line, for producing a lean air-fuel ignition means for causing an ignition of the combustible mixture in the engine body;

an exhaust line for removal of the resultant exhaust gas from the engine body;

means for detecting a degree of opening of the throttle valve;

means for calculating, based on the detected degree of opening of the throttle valve, a target amount of fuel for obtaining a lean air-fuel mixture when the engine is in a range where the throttle valve is opened;

means for operating the fuel supply means so that the calculated amount of fuel is supplied to the engine body;

means for calculating, based on the detected degree of opening of the throttle valve, an ignition timing and;

means for operating said ignition means so that the calculated ignition timing is obtained.

DESCRIPTION OF A PREFERRED EMBODIMENT

Figure 1:
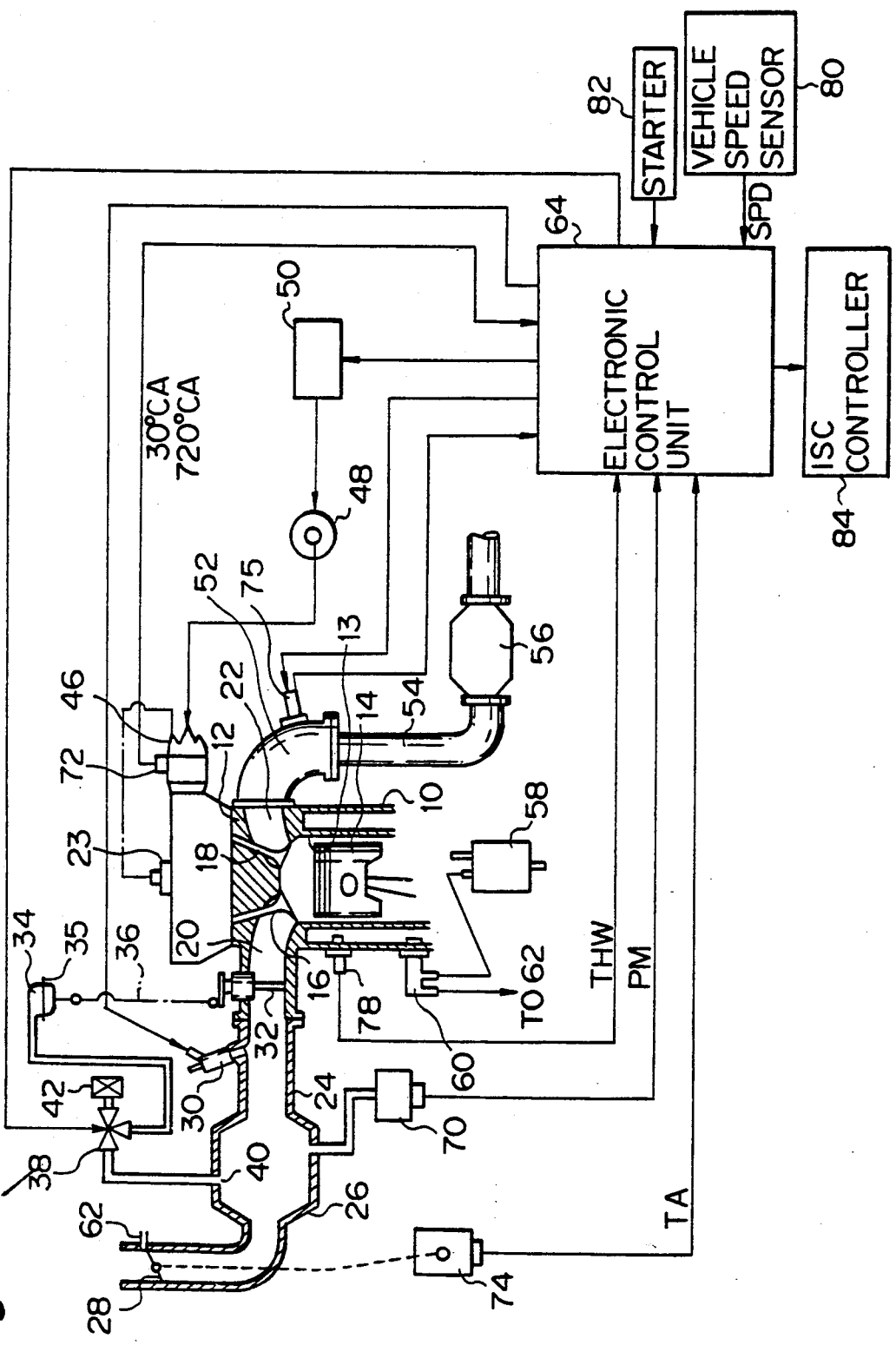
FIG. 1 is a schematic general view of a lean burn internal combustion engine according to the present invention.

Now the present invention will be described with reference to the attached drawings. FIG. 1 shows an electronic controlled internal combustion engine of fuel injection type, wherein reference numeral 10 denotes a cylinder bock, 12 a cylinder head, 13 a cylinder bore, 14 a piston, 16 an intake valve, 18 an exhaust valve, 20 an intake port, 22 an exhaust port, and 23 a spark plug. The intake port 20 is connected to an intake manifold 24 and to a surge tank 26, which is connected to a throttle valve 28 for controlling the amount of intake air. A fuel injector 30 is connected to the intake air. A fuel injector 30 is connected to the intake manifold 24 for introducing an amount of fuel into the intake manifold 24. A swirl control valve (SCV) 32 is arranged in the intake port 20, to partially close or open the intake pot 20 in the manner well known to those skilled in this art. When the SCV 32 is closed, a swirl motion of the air-fuel mixture is created when it is introduced into the cylinder bore 13, which allows the air-fuel mixture to be burnt if it is very lean. When the SCV 32 is open, a relatively straight flow of the air-fuel mixture is obtained, which is adapted as a combustion air-fuel mixture other than super lean.

The SDV 32 is connected to a vacuum type actuator 34 having a diaphragm 35 connected to the SCV 32 via a connecting member 36 such as a rod. A vacuum switching valve (VSV) 38, such as a three port electromagnetic valve, is provided, and is switched between a first position at which the diaphragm, 35 is opened to a vacuum pot 40 in the huge tank 26, so that the vacuum pressure in the surge tank 26 causes the diaphragm 35 to be displaced and the SCV 32 is closed to obtain the swirl motion which allows the super lean air-fuel mixture to be stably burnt, and a second position at which the diaphragm 35 is open to the atmospheric pressure via an air filter 42, so that the atmospheric pressure causes the diaphragm 34 to be returned to the original position and the SCV 32 is opened to obtain a straight flow for the air-fuel ratio needed for the output power of the engine.

Reference numeral 46 denotes a distributor which is connected to an ignition coil 48 operated by a igniter 50. As is well known, the distributor 46 is selectively connected to the spark plugs 23 of the respective cylinders.

The exhaust port 22 is connected to a exhaust manifold 52, which is connected to an exhaust pipe 54 and a catalytic converter 56.

a charcoal canister 58 is sued for a temporary storage of a vaporized fuel from a fuel tank, and for re-introducing same into the engine. A purge control valve 60 is mounted on the cylinder block 10 and responds to a temperature of the engine cooling water for introducing the stored fuel in the canister 58 into the intake line at a purge port 62 located upstream of the throttle valve 28, when in the idle position.

An electronic control unit 64 is constructed as a microcomputer to various signals from sensors for controlling the fuel injectors 30 for controlling the air-fuel ratio, the igniter 50 for controlling the ignition timing, the vacuum switching valve (VSV) 38 for controlling the position of the swirl control valve (SCV) 32, and other engine operating units which are not explained as they are not related to the present invention. An intake pressure sensor 70 is connected to the surge tank 26 for detecting the absolute pressure PM in the surge tank 26 as an indication of the engine load. A crank angle sensor 72 is connected to the distributor 46 for obtaining pulse signals at every 30 degrees and 720 degrees of the angle of the crankshaft (CA) of the engine. The 30 degree CA signal is used to calculate the engine speed NE, as is well known, and the 720 degree CA signal is used as a reference signal in one full cycle of the engine. A throttle sensor 74 is connected to the throttle valve 28 for detecting the degree of opening of the throttle valve 28, and is provided with a VL switch which made ON or OFF according to a predetermined degree y of the throttle valve 28, above which the air-fuel ratio is controlled to a power air-fuel ratio equal to, for example, 13.5, in this embodiment. A lean type air-fuel ratio sensor 75 is arranged on the exhaust manifold 52 for detecting the air-fuel ratio of the combustible mixture introduced into the engine. A engine cooling water temperature sensor 78 is connected to the cylinder block 10 in contact with the engine cooling water, to detect its temperature, THW. A vehicle speed sensor 80 detects the vehicle speed SPD. A starter 82 and well known idle speed controller 84 are connected to the control unit 64.

Figure 2:
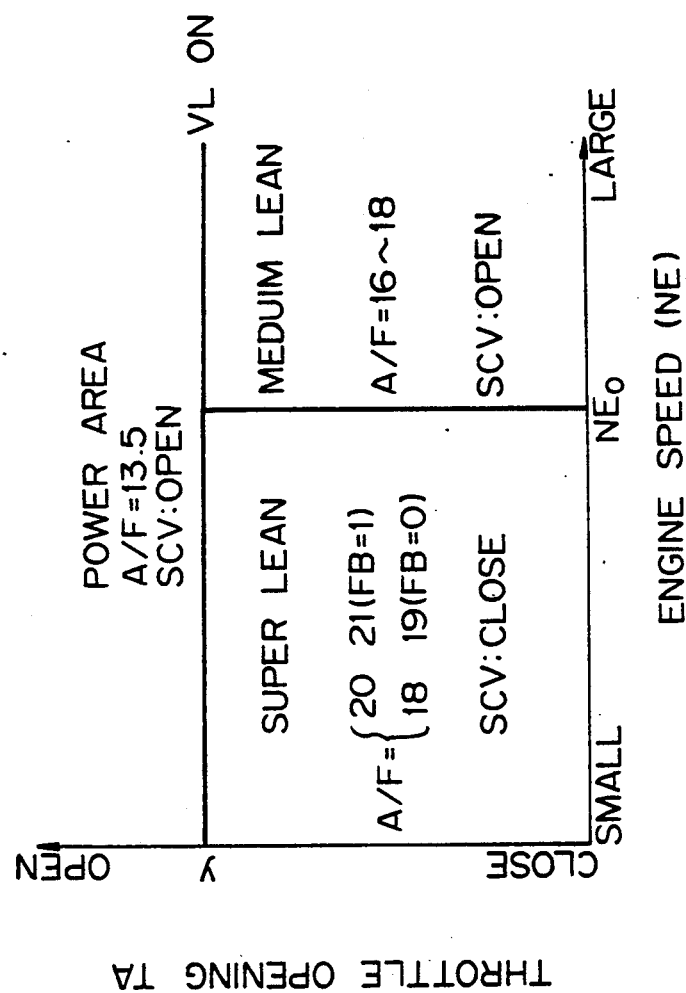
FIG. 2 shows a map with respect to engine speed and degree of opening of a throttle value, and illustrating how an air-fuel ratio is determined.

FIG. 2 is a schematic drawing of a map indicating how the air-fuel ratio and the swirl control valve 32 are controlled with respect to combinations of the values of the engine speed NE and the degree of throttle opening TA. A lean air-fuel mixture is obtained in the area where the degree of throttle opening TA is smaller than the predetermined value y, which corresponds to a point at which the VL switch in the throttle sensor 74 is changed between the ON position and the OFF position. The lean zone is divided into two zones; a super lean zone, and a medium lean zone. The super lean zone is obtained at an engine speed NE less than the predetermined value $NE_0$, where the air-fuel ratio is, for example, between 20 to 21 when an air-fuel ratio feedback operation is carried out (FB=1), and is, for example, between 18–19 when the air-fuel ratio feedback operation is not carried out (FB=0). Under the super lean condition, the SCV (swirl control valve) 32 is closed to obtain the swirl movement of the air-fuel mixture in the cylinder bore 13. The medium lean zone is obtained at an engine speed NE higher than the predetermined value $NE_0$, where the air-fuel ratio is, for example, between 16 to 18. The feedback control of the air-fuel ratio is not carried out in the medium lean zone, and the SCV 32 is opened to increase the intake efficiency.

A power air-fuel ratio area is obtained when the degree of throttle opening TA is larger than the predetermined value v. Under this power air-fuel ratio area, the air-fuel ratio is controlled to a value such as 13.5, which is smaller than the theoretical air-fuel ratio value, and the SCV 32 is opened.

In a lean burn internal combustion engine, the fuel injection amount is calculated from a basic fuel amount for obtaining a stoichiometric air-fuel ratio. To the basic amount a lean correction factor having a value of less than 1.0 is multiplied so that a lean air-fuel mixture of an air-fuel ratio higher than the stoichiometric air-fuel ratio is obtained. As is well known, a map KAF of the values of the lean correction factor with respect to the combinations of the values of the engine speed and engine load parameters, such as the intake absolute pressure PM, are provided, and a map interpolation calculation is carried out to obtain a value of the lean correction factor corresponding to a detected combination of the values of the engine speed and intake pressure.

Figure 3A:
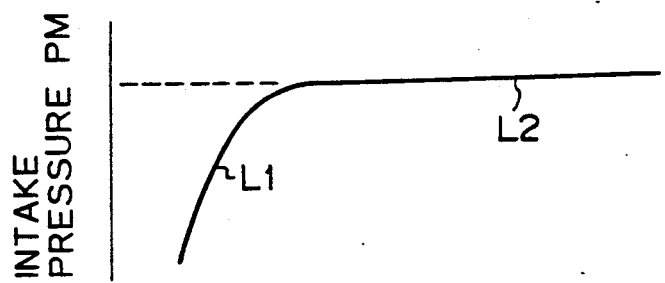
FIGS. 3(a) to (c) show changes in intake pressure, air-fuel ratio, and engine torque, respectively, with respect to the degree of opening of the throttle vale.
Figure 3B:
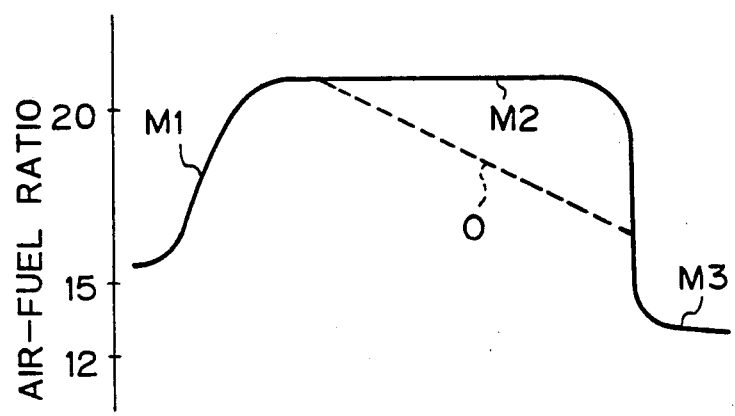

The calculation of the lean correction factor based on the intake pressure is used for executing precise control of a desired air-fuel ratio at a low load condition at a small degree of throttle opening, where a super lean combustion of an air-fuel ratio as high as, for example, 21.0, is carried out. The calculation of the lean correction factor suffers from a drawback, however, in that a smooth control of the engine torque cannot be obtained as the accelerator pedal is depressed. FIG. 3(a) shows a relationship between the degree of opening TA of the throttle valve 28 and the value of the intake pressure PM. A linear and steep relationship is obtained, as shown by a curve portion L1, in a area where the degree of opening of the throttle valve 28 is smaller than a predetermined degree x, so that a desired lean air-fuel ratio as shown by M1 in FIG. 3(b) is obtained. Where the degree of throttle valve 28 is wider than the predetermined value x, however, the value of the intake pressure is remains unchanged, as shown by a line L2. In this case, the intake pressure corresponds to the atmospheric air pressure, and as a result, the air-fuel ratio remains substantially unchanged in the lean zone, as shown by a line M2. When the throttle valve 28 is opened to a degree y, the engine enters the power area wherein an acceleration fuel enrichment correction is carried out to obtain an air-fuel ratio which is smaller than the theoretical air-fuel ratio, as shown by a line M3 in FIG. 3(b). A torque characteristic in the prior art lean burn engine is shown by a solid line in FIG. 3(c), where the engine torque is maintained as low as a line N1 when the degree of opening of the throttle valve 28 is lower than y, and when this opening y is obtained, the engine torque is abruptly increased as shown by a line N2, causing the driver to feel some discomfort.

Figure 3C:
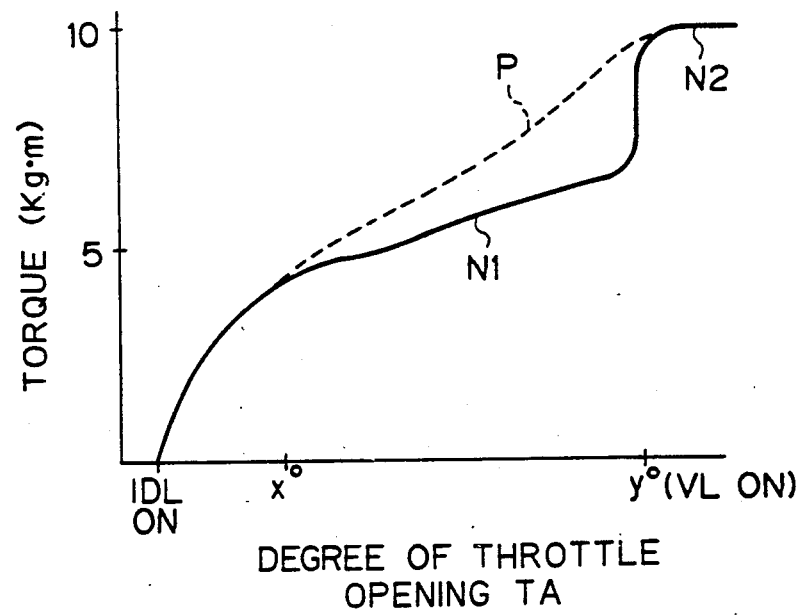

To overcome this drawback, the present invention provides, another lean correction factor map KAFTA. The KAFTA map has values of the lean correction factor with respect to combinations of values of the engine speed and degree of opening of the throttle valve 28. The KAFTA map represents a range where the degree of opening of the throttle valve is larger than the predetermined value x, so that the air-fuel ratio is lowered in accordance with the increase in the degree of opening of the throttle valve, as shown by a dotted line 0 in FIG. 3(b). As a result, a torque increase characteristic as shown by line P in FIG. 3(c) is obtained, which is smoothly connected to the line N2 when the engine enters the power enrichment area, thus preventing the occurrence of an acceleration shock.

Figure 4:
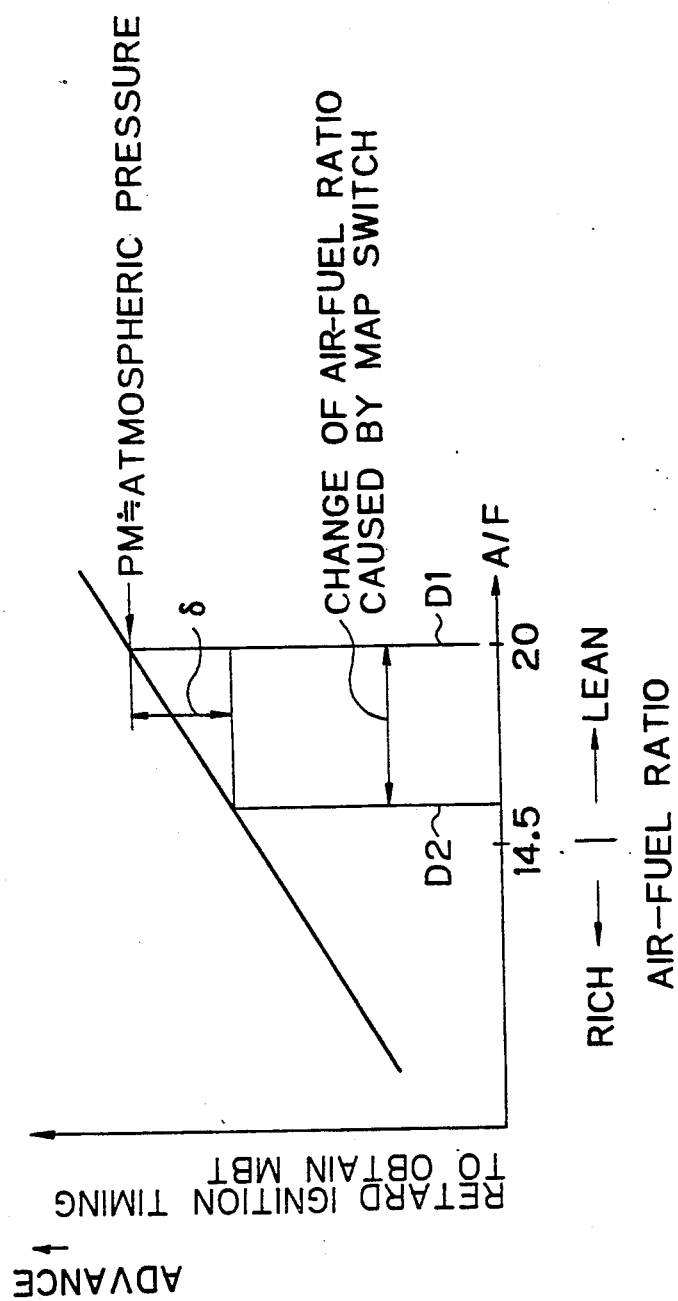
FIG. 4 shows a relationship between an air-fuel ratio and an ignition timing delay value, for obtaining MBT.

With regard to the control of the ignition timing, in the prior art, an ignition timing value map ABSE based on the engine intake pressure PM and the engine speed NE is provided, which is used in the entire lean combustion zone. In the present invention, however, the air-fuel ratio is controlled by the lean correction factor map KAFTA based on the throttle opening in the area in which the degree of opening of the throttle valve is larger than x. FIG. 4 shows a relationship between the air-fuel ratio and the ignition timing capable of obtaining the maximum combustion pressure, MBT, to which the ignition timing should be controlled. As will be easily seen, the larger the air-fuel ratio, i.e., the leaner the air-fuel mixture, the larger the value of the MBT, i.e., the ignition timing can be further advanced. In FIG. 4, line D1 is an air-fuel ratio obtained when the PM map is used, and line D2 is an air-fuel ratio obtained when the TA map is used. Thus, to obtain the MBT, a control of the ignition timing to a value of $\delta$ is necessary. Therefore, according to the present invention, a further map, ATA, of the ignition timing based on the throttle opening is provided, which is used in the area in which the lean correction factor map KAFTA based on the throttle valve is used.

Figure 5:
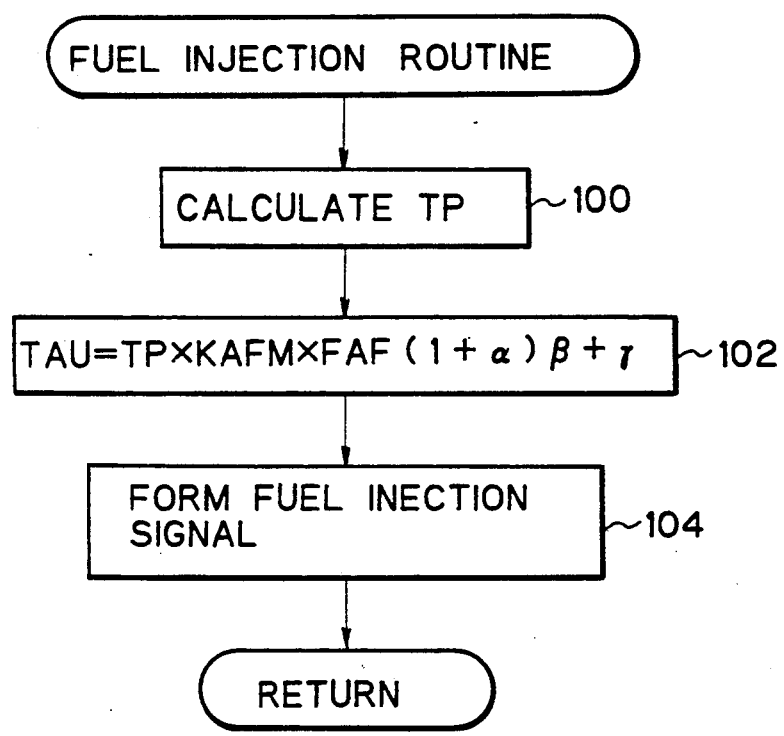
FIGS. 5 to 8 are flowcharts illustrating how the control circuit in FIG. 1 operates to control the engine.

Now, the operation of the electronic control unit 64 for operating the fuel injectors 30, the igniter 50, and the three way switching valve 38 will be described with reference to the flowcharts. FIG. 5 is a fuel injection routine which is carried out at each timing of an execution of a fuel injection by the respective fuel injectors 30. This timing is obtained at every 180 degrees crank angle for a four cylinder engine, and can be obtained by detecting the number of the counter, which is incremented at each input of a 30 degree crank angle signal from the crank angle sensor 72 and is cleared at each input of a 720 degree crank angle signal from the sensor 72, as is well known. At step 100, a calculation of a basic fuel injection amount TP is carried out, which corresponds to an amount of fuel required for obtaining a theoretical air-fuel ratio for the intake pressure and the engine speed at this point. A map of the values of basic fuel injection amount with respect to combination of the values of the intake pressure PM and engine speed NE is provided, and a well known map interpolation calculation is carried out to obtain a value of a basic fuel injection amount TP corresponding to the detected PM and NE values.

At step 102, a fuel injection amount TAU is calculated by $$TAU = TP \times KAFM \times FAF(1+\alpha)\beta + \gamma,$$

where KAFM is an air-fuel ratio correction factor and FAF is a feedback correction factor, and $\alpha, \beta$ and $\gamma$ indicate generally a correction factor or correction amount for correcting the fuel injection amount, which are not explained because they are not closely related to the present invention.

At step 104, a fuel injection signal to be supplied to the fuel injector 30 of a designated cylinder is formed so that a fuel injection of the amount TAU calculated at the step 102 is carried out.

Figure 6:
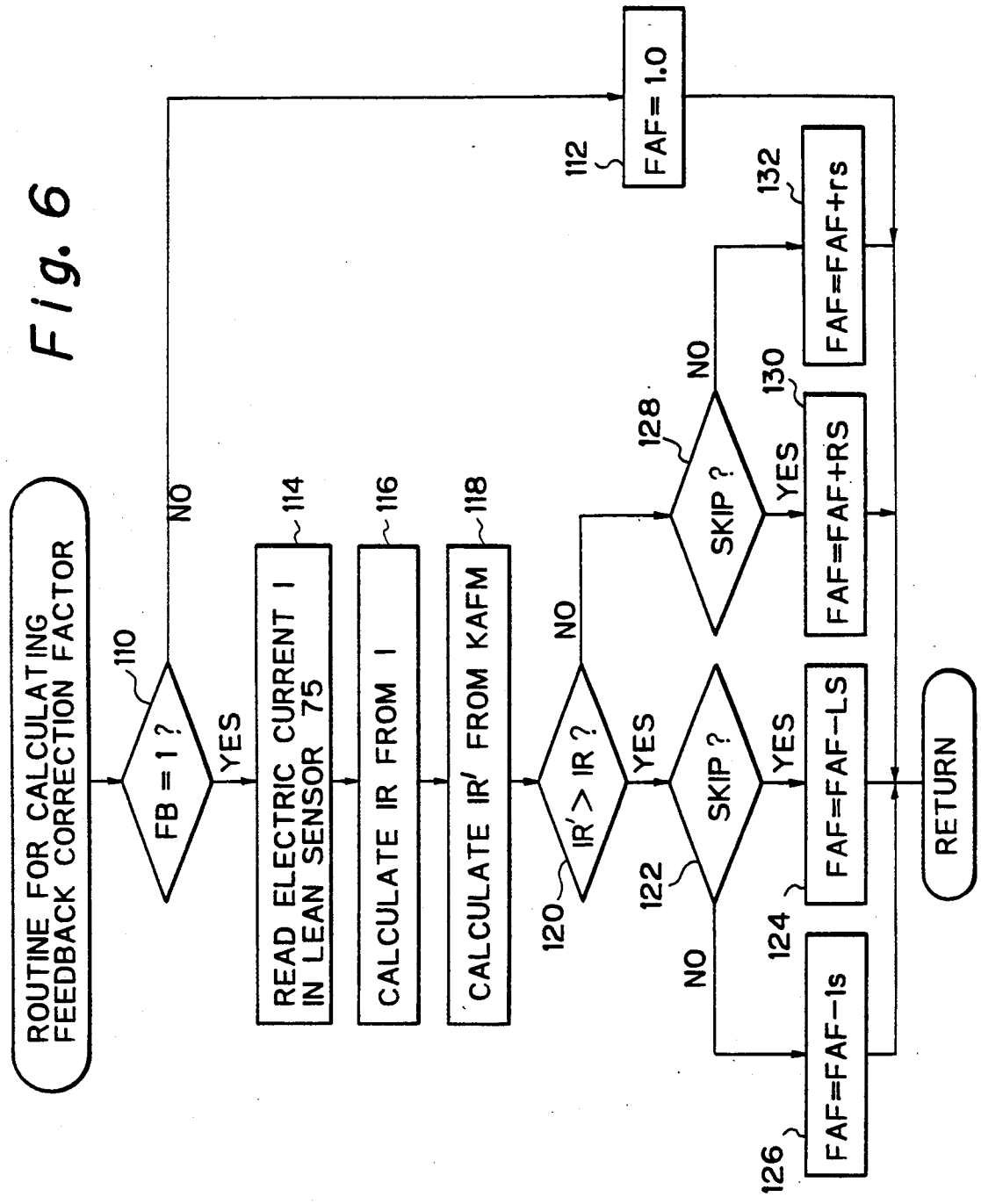

FIG. 6 shows a routine illustrating a flowchart for calculating the feedback correction factor FAF used at step 102 in FIG. 5. This routine is carried out at a predetermined interval such as 4 milliseconds. At step 110, it is determined if a feedback flag FB is set. This flag FB is set (1) when the air-fuel ratio feedback control is carried out, and reset (0) when the air-fuel result FB=0 is obtained (the air-fuel ratio feedback control is not carried out), the routine goes to step 112, and the FAF is given the value 1.0.

When the result is FB=1 (the air-fuel ratio feedback control is carried out), the routine goes to step 114 and an electric current I in the lean sensor 75 is input. At the following step 116, a calculation is made for converting the detected electric value I to a value IR which corresponds to the air-fuel ratio of the combustible mixture introduced into the engine. A map of IR values with respect to the values of I is stored in the memory, and a map interpolation calculation is carried out to obtain an IR value corresponding to a detected electric current I. At step 118, a reference value IR' as a target air-fuel ratio is calculated from the air-fuel ratio correction factor KAFM. As described later, when the feedback control of the air-fuel ratio is carried out, the KAFM has a value higher than the theoretical air-fuel ratio required for obtaining a lean air-fuel mixture. At step 120, it is determined if the IR' as the target air-fuel ratio is larger than the IR as the actual air-fuel ratio. When IR' is larger than IR, i.e., the air-fuel ratio should be controlled so that air-fuel ratio is increased, the routine goes to step 122 where the first determination of IR'->IR is 10 obtained at the step 120, i.e., a skip control is carried out. If the result of the determination at this step is YES, the routine goes to step 124, where the feedback correction factor FAF is decremented for a value of LS, i.e., a lean skip correction. When a result of NO is obtained at step 122, i.e., the determination of IR'>IR is not the first one at the step 120, the routine goes to step 126 and the feedback correction factor FAF is decremented for ls (<LS), i.e., an integration correction is made.

When it is determined at step 120 that IR' is not larger than IR, i.e., the air-fuel ratio should be lowered, the routine goes to step 128, where it is determined if the first determination of IR'<IR is obtained at step 120, i.e., a skip control is carried out. If the result of the determination at this step is YES, the routine goes to step 130, where the feedback correction factor FAF is incremented for a value of RS, i.e., a rich skip correction is made. When a result of NO is obtained at step 122, i.e., the determination of IR'>IR is not the first one at step 128, the routine goes to step 132 where the feedback correction factor FAF is incremented for rs (<RS), i.e., an integration correction is made. As a result of the above feedback control operation, the air-fuel ratio is controlled to the target air-fuel ratio.

Figure 7:
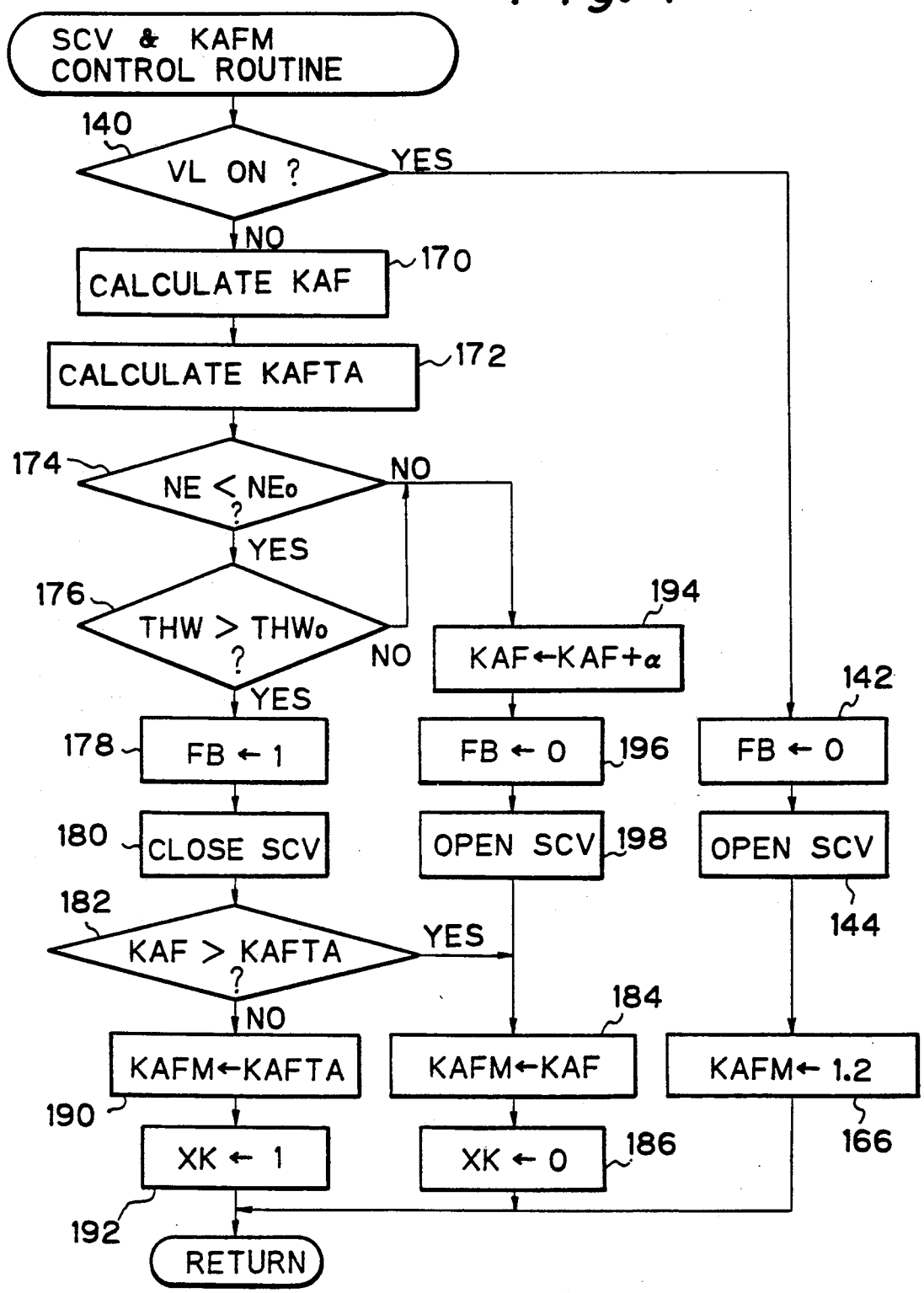

FIG. 7 shows a routine for controlling the swirl control valve (SCV) and the air-fuel ratio correction factor KAFM. This routine is executed at predetermined intervals such as 4 milliseconds. At step 140, it is determined if the VL switch in the throttle sensor 74 is ON, i.e., the degree of opening of the throttle valve 28 is, as shown in FIG. 2, larger than the predetermined degree of opening y. When the VL switch is ON, i.e., the engine is in the power area at which the throttle opening is larger than y, the routine goes to step 142 and the feedback flag FB is cleared (0) so that the air-fuel ratio feedback control is stopped, as realized at step 112 in FIG. 6. At the following step 144, a signal is sent to the three way valve 38 and it is located at a position where the diaphragm 35 of the actuator 34 is open to the atmospheric pressure, so that the SCV 32 is opened which causes a straight air flow into the cylinder bore 13, which is adapted for the power mode of the engine. At the following step 166, a value of 1.2 is moved to the air-fuel ratio correction factor KAFM, so that a rich air-fuel mixture having an air-fuel ratio value such as 13.5 is obtained as shown in FIG. 2.

When it is determined at step 140 that the VL switch is OFF, i.e., the degree of opening of the throttle valve 28 is smaller than the predetermined degree of opening y, the routine goes to step 170, where a map interpolation calculation of an intake pressure based lean correction factor KAF is carried out. This map is used for obtaining the lean air-fuel mixture at the lean combustion area where the value of the intake pressure PM can change linearly, as shown by the line Ll in FIG. 3(a), as the accelerator pedal is depressed, which corresponds to the degree of opening of the throttle valve 28 smaller than x. This map is constructed by KAF values, with respect to combinations of the values of the engine speed NE and the intake pressure PM. This KAF map is constructed, for example, as follows.

|  |  | NE (R.P.M) | | | |
| --- | --- | --- | --- | --- | --- |
|  |  | 600 | 800 | 1000 | 1200 |
| PM (mmHg) | 211 | 0.75 | 0.75 | 0.75 | 0.75 |
|  | 289 | 0.625 | 0.625 | 0.625 | 0.5 |
|  | . | . | . | . | . |
|  | . | . | . | . | . |
|  | 758 | 0.5 | 0.5 | 0.5 | 0.4 |

At step 170, a map interpolation calculation is carried out to obtain a KAF value corresponding to a combination of detected values of the intake pressure PM and the engine speed NE.

At step 172, a map interpolation calculation of the throttle opening based lean correction factor KAFTA is carried out. This map is used for obtaining the lean air-fuel ratio mixture at the lean combustion area where the value of the intake pressure PM is maintained, as shown by the line L2 in FIG. 3(a), regardless of the depression of the accelerator pedal, which corresponds to the degree of opening of the throttle valve 28 between x and v. This map is constructed by KAFTA values with respect to the combinations of values of the engine speed NE and the throttle opening TA. This KAFTA map is constructed, for example, as follows.

|  |  | NE (R.P.M) | | | | |
| --- | --- | --- | --- | --- | --- | --- |
|  |  | 600 | 800 | 1000 | 1200 | — |
| TA (degree) | 39 | 0.55 | 0.55 | 0.55 | . | . |
|  | 46 | 0.7 | 0.7 | . | . | . |
|  | 55 | 0.9 | . | . | . | . |
|  | . | . | . | . | . | . |
|  | . | . | . | . | . | . |

It should be noted that the values of the lean values of correction factor in the FAFTA map are determined such that, at the area of the throttle valve opening smaller than the predetermined value x, the FAFTA value are smaller than the corresponding values of the correction factor in the FAF map, which allows the FAF map having a higher air-fuel ratio correction value to be selected at this area (YES result at step 182), and such that, at the area of the throttle valve opening higher than the predetermined value x, the FAFTA value is larger than the corresponding values of the correction factor in the FAF map, which allows the FAFTA map to be selected in this area (NO result at step 182).

At step 172, a map interpolation calculation is carried out to obtain a KAFTA value corresponding to a combination of detected values of the throttle opening TA and the engine speed NE.

At step 174, it is determined if the engine speed NE is smaller than the predetermined value $NE_o$, and at step 176, it is determined if the cooling water temperature THW is higher than a predetermined value $THW_o$. When the engine speed $NE < NE_o$ and the $THW > THW_o$, i.e., the engine is under a feedback condition, the routine goes to step 178, and the air-fuel ratio feedback control flag FB is set (1) so that air-fuel ratio feedback control is carried out (step 110 in FIG. 6). At the following step 180, a signal is sent to the three way switching valve 38 and it takes a position whereat the intake vacuum port 40 is connected to the diaphragm 35 of the actuator 35, so that the swirl control valve (SCV) 32 is closed to obtain a swirl movement of the air introduced into the cylinder bore 13, for obtaining a stable combustion of a super lean air-fuel mixture.

At step 182, it is determined if the value of the intake pressure based lean correction factor KAF is larger than the throttle opening based lean correction factor KAFTA. When it is determined that KAF<KAFTA, which occurs when the degree of opening of the throttle valve is smaller than x in FIG. 3, the routine goes to step 184, where the KAF value is moved to the KAFM. At the following step 186, a flag XK is reset (0), which shows that the intake pressure based map KAF is selected for calculating the air-fuel ratio correction factor KAFM.

When it is determined that KAF≦KAFTA, which occurs when the degree of opening of throttle valve is larger than x in FIG. 3, the routine goes to step 190, where the value of the KAFTA is moved to the KAFM. At the following step 192, a flag XK is set (1), which shows that the throttle opening base map KAFTA is selected for calculating the air-fuel ratio correction factor KAFM for obtaining a super lean air-fuel mixture.

These steps 182 to 192 are for using the one of the maps KAF and KAFTA which has a higher value. In other words, when the degree of opening of the throttle valve 28 is smaller than x, the map KAF is selected for controlling the air-fuel ratio so that it is changed as shown by the line M1 and M2 in FIG. 3(b), and when the degree of opening of the throttle valve is larger than x, the map FAFTA is selected for calculating the air-fuel ratio correction factor KAFM for obtaining a lean air-fuel mixture as shown by the line O in FIG. 3(b), which is less lean than that obtained if the map KAF were selected.

When it is determined at the step 174 that $NE \geqq NE_O$, or at step 176, that $THW \geqq THW_O$, i.e., the engine is under a non-feedback condition, the routine goes to step 194, where the value of the KAF is increased for a value α, which is used to obtain a less lean air-fuel mixture in the zone of the engine speed $NE \geqq NE_O$ or in the zone $NE < NE_0$ while the feedback is not carried out (FB=0) as shown in FIG. 2. At step 196, a feedback control flag FB is cleared, and at step 198, a signal is sent to the three way switching valve 38 to cause the valve 38 to assume a position whereby the atmospheric pressure is applied to the diaphragm 35, to open the SCV 32, and then the routine goes to step 184.

Figure 8:
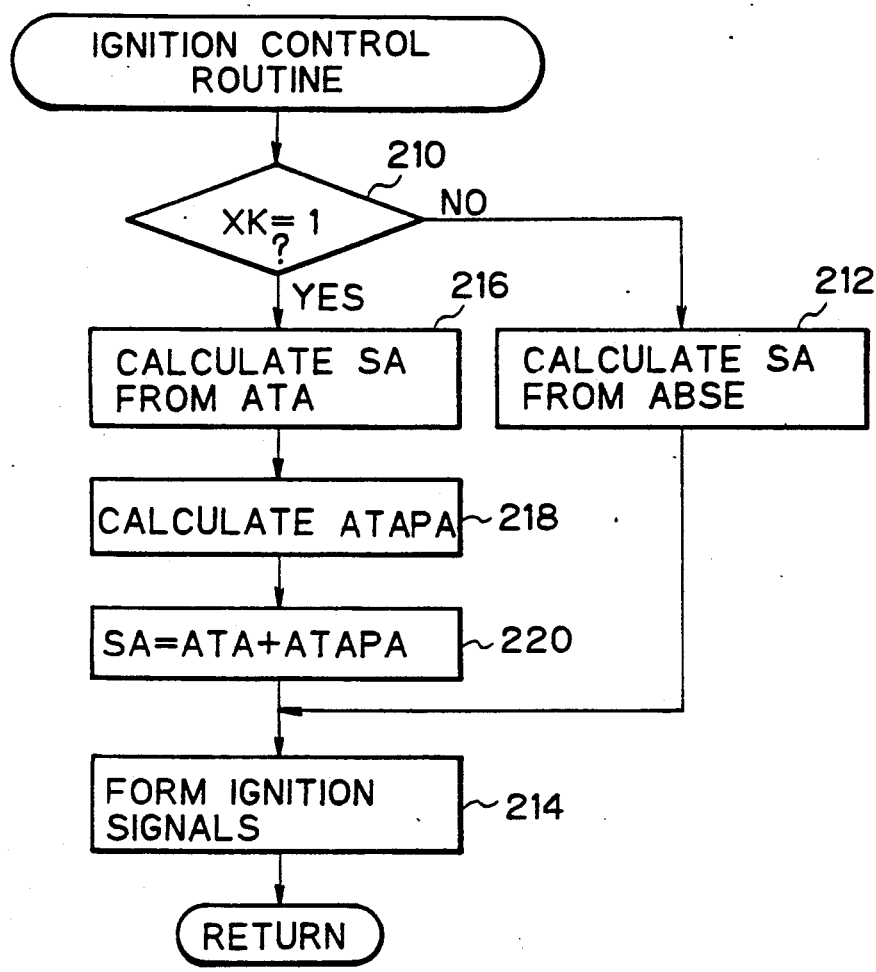

FIG. 8 shows a routing for controlling an ignition timing. This routine is carried out each time an ignition signal is input to the igniter 50, and appears at every 180 degrees of crank angle for a four cylinder engine. At step 210, it is determined if the flag XK is set (1). When it is determined that the flag XK=0, i.e., the intake pressure map KAF is selected (step 184) for calculating the air-fuel ratio correction factor, the routine goes to step 212, where an ignition timing SA is calculated from a map ABASE which is constructed by values of ignition timings with respect to combinations of values of the intake pressure PM and engine speed NE. As is well known, the timing SA is a value of the crank angle measured from the top dead center during the combustion stroke engine, which can produce the maximum combustion pressure at a combination of a value of the intake pressure and a value of the engine speed when the air-fuel ratio is controlled by the intake pressure based map KAF. At step 212, a map interpolation calculation is carried out to obtain a value of SA corresponding to a detected combination of the values of the intake pressure PM and engine speed NE.

At step 214, signals are sent to the igniter 50, in a manner well known to those skilled in this art, so that an ignition takes place at the SA timing calculated at step 212.

When it is determined that the flag XK=1, i.e., the throttle opening based map KAFTA is selected (step 190 in FIG. 7), the routine goes to step 216, where a calculation of the base ignition timing is carried out from a throttle opening based map ATA, which is constructed by values of the ignition timings with respect to combinations of the degree of opening of the throttle valve TA and the engine speed. These ignition timings are crank angle values producing the maximum torque at the corresponding combinations of the throttle opening TA and the engine speed when the air-fuel ratio is controlled by the throttle opening based map KAFTA. The map ATA is constructed, for example, as follows.

|  |  | NE (R.P.M) | | | |
|---|---|---|---|---|---|
|  |  | 1200 | 1600 | 2000 | — |
| TA (degree) | 39 | 16.4 | 23.7 | 24.4 | . |
|  | 47 | 8.4 | 12.4 | . | . |
|  | . | . | . | . | . |
|  | . | . | . | . | . |

As will be easily seen from the table, a more advanced ignition timing value is obtained as the engine speed is increased. With regard to the increase in the degree of opening of the throttle valve, the ignition timing advance is retarded. As is clear, at step 216, a map interpolation calculation is carried out to obtain a value of the ignition timing SA which corresponds to a detected combination of the throttle opening TA and engine speed NE.

At step 218, an altitude correction amount of the ignition timing ATAPA is calculated. When the engine is operating at a high altitude where the atmospheric pressure is low, knocking rarely occurs compared with a running at a low altitude where the atmospheric pressure is 760 mmHg. In other words, when operating at a high altitude, it is possible to use a much more advanced ignition timing to obtain the maximum combustion pressure, without the occurrence of knocking. The altitude correction is an advance correction added to the basic ignition timing value ATA when the engine is operating at a high altitude.

The map ATAPA map is, for example, constructed as follows.

|  |  | NE | | | |
|---|---|---|---|---|---|
|  |  | 1200 | 1600 | 2000 | — |
| PM (mmHg) | 494 | 8.7 | 9.4 | 12.0 | . |
|  | 572 | 8.2 | 8.7 | 10.1 | . |
|  | . | . | . | . | . |
|  | . | . | . | . | . |
|  | 729 | 1.4 | 1.4 | 0.5 | . |

As is clear, there is an increase in the altitude correction value as the intake pressure PM drops, i.e., operating at a low altitude, the atmospheric pressure is higher than 730 mmHg, and therefore, the altitude correction factor ATAPA is made zero because knocking will occur when a correction of the ignition timing in the advanced direction, even if small, is carried out.

At step 220, ATAPA is added to ATA to finally obtain the ignition timing SA.

Although an embodiment of the present invention described with reference to the attached drawings, many modifications and changes can be made by those skilled in this art without departing from the scope and spirit of the present invention.

We claim:

1. A lean burn internal combustion engine, comprising:
    an engine body;
    an intake line for introducing intake air into the engine body;
    a throttle vale in the intake line for controlling an amount of intake air introduced into the engine body;
    fuel supply means supplying an amount of fuel into the intake line for producing a combustible mixture;
    ignition means for causing an ignition of the combustible mixture in the engine body;
    an exhaust line for removing resultant exhaust gas from the engine body;
    means for detecting a degree of opening of the throttle valve;
    means for calculating a basic amount of fuel to be supplied by the fuel supply means which corresponds to a stoichiometric air-fuel ratio of the combustible mixture;
    first map calculating means for determining a correcting fuel amount based on the detected degree of opening of the throttle valve;
    correcting means for correcting the basic fuel amount by the correcting fuel amount to obtain a calculated leans air-fuel mixture;
    means for operating the fuel supply means to supply the calculated lean air-fuel mixture as the combustible mixture;
    second map calculating means for determining an ignition timing based on the detected degree of opening of the throttle valve when the basic fuel amount is corrected by the correcting means; and
    means for operating the ignition means at the ignition timing.

2. A lean burn internal combustion engine according to claim 1, further comprising means for correcting the calculated ignition timing in accordance with altitude.

3. A lean burn internal combustion engine, comprising:
    an engine body;
    an intake line for introducing intake air into the engine body;
    a throttle valve in the intake line for controlling an amount of intake air introduced into the engine body;
    fuel supply means supplying an amount of fuel into the intake line for producing a combustible mixture;
    ignition means or causing an ignition of the combustible mixture in the engine body;
    an exhaust line for removing resultant exhaust gas form the engine body;
    means for detecting an intake air pressure;
    means for detecting a degree of opening of the throttle valve;
    means for calculating a basic amount of fuel to be supplied by the fuel supply means which corresponds to a stoichiometric air-fuel ratio of the combustible mixture;
    a first correction map means for determining a first correcting fuel amount based on the detected intake air pressure;
    a second correction map means for detecting a second correcting fuel amount based on the detected degree of opening of the throttle valve;
    selected means for selecting a selected correcting fuel amount, the selected correcting fuel amount being selected as the first correcting fuel amount when the detected degree of opening of the throttle valve is less than a predetermined degree and the selected direction fuel amount being selected as the second correcting fuel amount when the detected degree of opening of the throttle valve is grease than or equal to the predetermined degree;
    means for correcting the basic fuel amount by the selected correcting fuel amount to obtain a calculated lean air-fuel mixture;
    means for operating the fuel supply means to supply the calculated lean air-fuel mixture as the combustible mixture;
    first ignition timing map means for determining a first ignition timing value based on eh detected intake air pressure;
    second ignition timing map means for determining a second ignition timing value based on the detected degree of opening of the throttle valve;
    means for calculating a calculated ignition timing based on eh first ignition timing valve when the selecting means selected the first correcting fuel amount, and calculating a calculated ignition timing value based on the second ignition timing value when the selecting means selected the second correcting fuel amount; and
    means for operating the ignition means at the calculated ignition timing value.

4. A leans burn internal combustion engine according to claim 3, wherein the selecting means comprises means for comparing the first correcting fuel amount and the second correcting fuel amount to select the larger of the value as the selected correcting fuel amount.

5. A leans burn internal combustion engine, comprising:
    an engine body;
    an intake line for introducing intake air into the engine body;
    a throttle valve in the intake line for controlling an amount of intake air introduced into the engine body;
    fuel supply means supplying an amount of fuel into the intake line for producing a combustible mixture;
    valve means arranged in the intake lien for providing, when closed, a swirl motion of the combustible mixture, and for providing, when open, a straight flow of the combustible mixture;
    actuator means for selectively opening and closing the valve means;
    ignition means for causing an ignition of the combustible mixture in the engine body;

an exhaust line for removing resultant exhaust gas from the engine body;

means for detecting an intake air pressure;

means for detecting a degree of opening f the throttle valve;

means for detecting an engine operating condition at which a lean air-fuel mixture should be supplied as the combustible mixture;

means for calculating a basic amount of fuel to be supplied by the fuel supply mans which corresponds to a stoichiometric air-fuel ratio of the combustible mixture;

a first correction map means for determining a first correcting fuel amount based on the detected intake air pressure;

a second correction map means for detecting a second correcting fuel amount based on the detected degree of opening of the throttle valve;

selecting means for selecting a selected correcting fuel amount, the selected correcting fuel amount being selected as the fist correcting fuel amount when the directed degree of opening of the throttle valve less than a predetermined degree and the selected correcting fuel amount being selected as the second correcting fuel amount when the detected degree of opening of the throttle valve is greater than or equal to the predetermined degree;

means for correcting the basic fuel amount by the selected correcting fuel amount to obtain a calculated lean air-fuel mixture;

means for operating the fuel supply means to supply the calculated lean air-fuel mixture as the combustible mixture;

first ignition timing map means for determining a first ignition timing value based on the detected intake air pressure second ignition timing map means for determining a second ignition timing value based on the detected degree of opening of the throttle valve;

means for calculating a calculated ignition timing based on the first ignition timing value when the selecting means selected the first correcting fuel amount, and calculating a calculated ignition timing value based on the second ignition timing value when the selecting means selected the second correcting fuel amount;

means for operating the ignition means at the calculated ignition timing value; and means for operating the actuator to close the valve means when the engine operating condition is detected;

6. A lean burn internal combustion engine according to claim 5, wherein the selecting means selects as the selected correcting fuel amount a correcting fuel amount for obtaining an enriched air-fuel mixture as the combustible mixture when the detected degree of opening of the throttle valve exceeds a second predetermined degree.

* * * * *